United States Patent
Bagsby et al.

(10) Patent No.: US 7,627,501 B2
(45) Date of Patent: Dec. 1, 2009

(54) SYSTEM AND METHOD OF SERVICE PRODUCT OFFER MANAGEMENT

(75) Inventors: Denis Bagsby, Waterloo, IL (US); Adam Klein, Cedar Park, TX (US); Lee M. Chow, Chicago, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 852 days.

(21) Appl. No.: 11/264,815

(22) Filed: Oct. 31, 2005

(65) Prior Publication Data
US 2007/0101351 A1 May 3, 2007

(51) Int. Cl.
G06Q 30/00 (2006.01)
H04N 7/16 (2006.01)
H04N 7/173 (2006.01)

(52) U.S. Cl. .................... 705/26; 725/91; 725/118
(58) Field of Classification Search .................. 705/26, 705/27; 725/103, 118, 131, 132, 151, 152, 725/153, 91
See application file for complete search history.

(56) References Cited

U.S. PATENT DOCUMENTS

| | | | |
|---|---|---|---|
| 6,670,971 | B1 | 12/2003 | Oral |
| 6,745,223 | B1* | 6/2004 | Nobakht et al. ............. 709/200 |
| 6,799,326 | B2* | 9/2004 | Boylan et al. ................. 725/35 |
| 6,993,499 | B2* | 1/2006 | Gagnon et al. ................ 705/26 |
| 7,010,500 | B2* | 3/2006 | Aarnio ........................ 705/26 |
| 7,574,380 | B2* | 8/2009 | Karaoguz et al. ............. 705/26 |
| 2002/0104099 | A1* | 8/2002 | Novak ........................ 725/136 |
| 2003/0056213 | A1* | 3/2003 | McFaddin et al. ............. 725/32 |
| 2003/0192057 | A1 | 10/2003 | Gaughan et al. |
| 2006/0123451 | A1 | 6/2006 | Preisman |
| 2006/0259927 | A1* | 11/2006 | Acharya et al. ............... 725/61 |

2007/0250875 A1* 10/2007 Weaver ........................ 725/89

FOREIGN PATENT DOCUMENTS

EP 1517559 A2 3/2005

OTHER PUBLICATIONS

Poe, R., "A Clearer Signal for Telco TV?" (Abstract only), America's Network, vol. 108, No. 13, p. 14, Sep. 1, 2004.*
Anon., "SBC, Microsoft Ink IPTV Deal," EWeek, p. 20, Nov. 22, 2004.*
Anon., "Local Schools in Forefront of New Age," Hudson Valley Business Journal, p. 5, Mar. 7, 2005.*

(Continued)

Primary Examiner—Nicholas D Rosen
(74) Attorney, Agent, or Firm—Toler Law Group

(57) ABSTRACT

The disclosure is generally directed to a system and method of managing and deploying Internet protocol television (IPTV) services. The method includes a service product offer management and deployment system. The method further includes a service product ordering subsystem to receive and process a service product order in response to service product offer. The service product order identifies a particular communication service subscriber, a service area, a service control group, a service product attribute, a facility deployment component, and a set of permitted end user device types. The method also includes a service delivery platform subsystem coupled to the service product ordering subsystem. Further, the method includes an Internet protocol television deployment subsystem coupled to the service delivery platform. The Internet protocol television deployment subsystem includes a plurality of video content packages.

23 Claims, 6 Drawing Sheets

OTHER PUBLICATIONS

"Input Document," International Telecommunication Union, 1st FG IPTV Meeting, Geneva, Jul. 10-14, 2006, pp. 1-3.

International Search Report and Written Opinion for International Application No. PCT/US06/38481, mailed Apr. 25, 2007.

* cited by examiner

SYSTEM AND METHOD OF SERVICE PRODUCT OFFER MANAGEMENT

FIELD OF THE DISCLOSURE

The present disclosure relates to a system and method of deploying television content related services.

BACKGROUND

For years, televisions have been a staple of consumer electronics sales. As such, a large majority of households in the United States owns at least one television. Providing content to those televisions is a lucrative business and there are numerous types of television content to choose from. For example, viewers can subscribe to digital broadband television networks and digital satellite television networks in order to receive standard digital television content or high definition television content.

In many cases, a set top box device is required at a customer location in order to receive television content from a content provider and decode the television content before transmitting the content to a television. Additionally, services can be ordered via the set top box device.

DETAILED DESCRIPTION OF THE DRAWINGS

The disclosure is generally directed to a system and method of managing and deploying Internet protocol television (IPTV) services. In a particular embodiment, the method includes a service product offer management and deployment system. The method further includes a service product ordering subsystem to receive and process a service product order in response to service product offer. The service product order identifies a particular communication service subscriber, a service area, a service control group, a service product attribute, a facility deployment component, and a set of permitted end user device types. The method also includes a service delivery platform subsystem coupled to the service product ordering subsystem. Further, the method includes an Internet protocol television deployment subsystem coupled to the service delivery platform. The Internet protocol television deployment subsystem includes a plurality of video content packages. One of the plurality of content packages is selected for permitted transmission and is granted access to protected content for a particular subscriber based on the service product order for the particular communication service subscriber.

Figure 1:
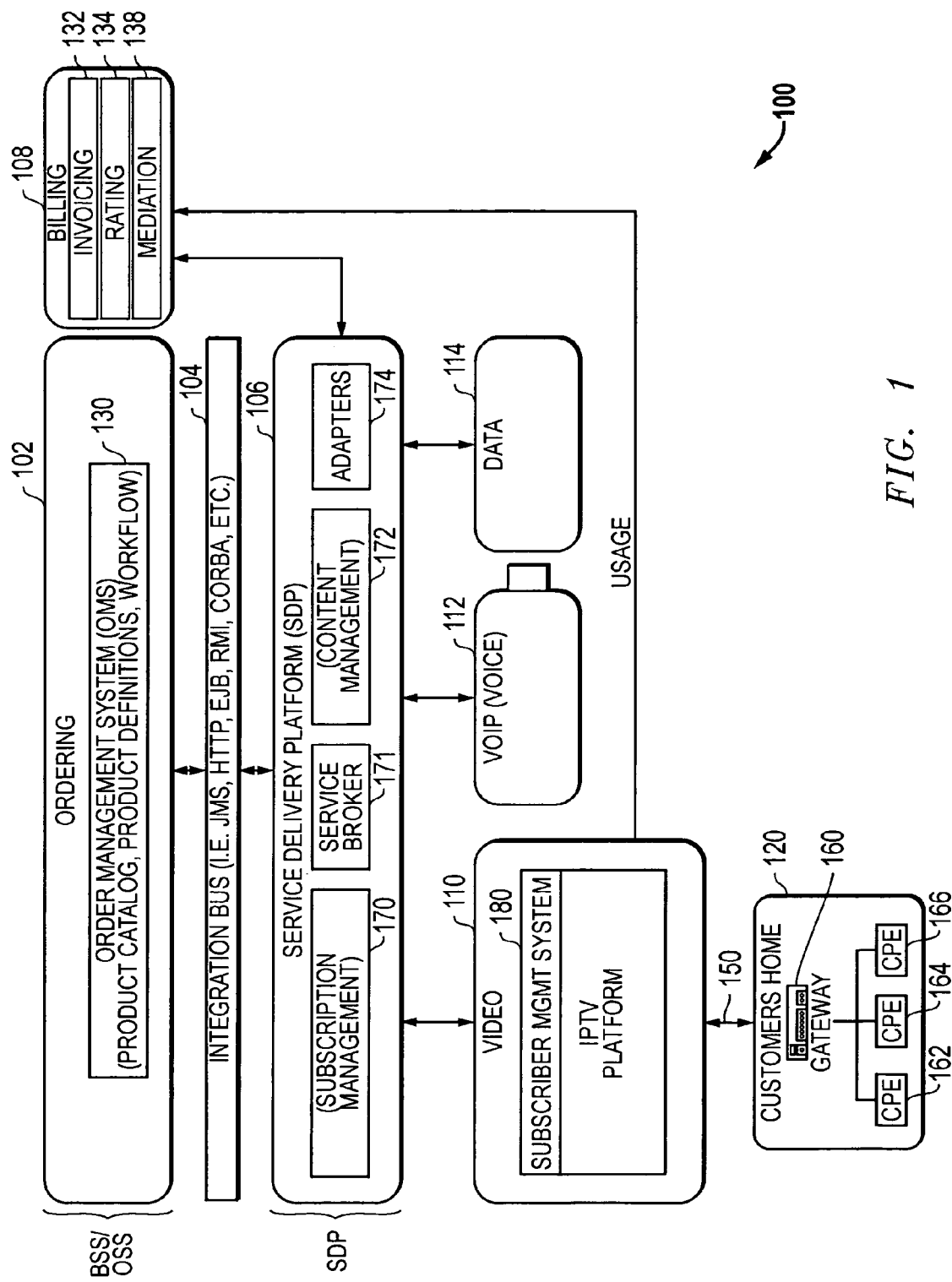
FIG. 1 is a general block diagram that illustrates elements of an Internet protocol television (IPTV) system.

Referring to FIG. 1, elements of an IPTV system that is generally designated 100 are shown. As illustrated in FIG. 1, the system 100 includes a service product ordering subsystem 102 that is coupled to a service delivery platform subsystem 106 via an integration bus 104. In a particular embodiment, the service product ordering subsystem 102 and the service delivery platform subsystem 106 communicate using java messaging service (JMS), hypertext transfer protocol (HTTP), enterprise java beans (EJB), java remote method invocation (RMI), common object request broker architecture (CORBA), or other similar mechanisms.

FIG. 1 indicates that a billing subsystem 108, a Internet protocol television (IPTV) deployment subsystem 110, a voice over Internet protocol (VoIP) subsystem 112, and a data subsystem 114 can be coupled to the service delivery platform subsystem 106. As indicated in FIG. 1, the billing subsystem 108 is also coupled to the IPTV deployment subsystem 110.

As shown in FIG. 1, a representative customer home 120 is coupled to the IPTV deployment subsystem 110. Specifically, a gateway device 160 is coupled to the IPTV deployment subsystem 110 via a communication link 150. A first customer premises equipment (CPE) 162, a second CPE 164, and a third CPE 166 are coupled to the gateway device 160.

In a particular embodiment, the service product ordering subsystem 102 includes an ordering management system (OMS) 130 that can include one or more product catalogs, product definitions, and a workflow. Further, the SDP subsystem 106 includes a subscription management module 170, a service broker module 171, a content management module 172, and one or more adapters 174. Additionally, as depicted in FIG. 1, the IPTV deployment subsystem 110 includes a subscriber management system 180 that includes an IPTV platform.

FIG. 1 also indicates that the billing subsystem 108 can include an invoicing module 132. The billing subsystem 108 can also include a rating module 134 and a mediation module 138.

In a particular embodiment, during operation the service product ordering subsystem 102 can receive and process a service product order that identifies a particular communication service subscriber, a service area, a service control group, a service product attribute, a facility deployment component, and a set of permitted end user device types. The service product attribute can identify a product offer, e.g., video; video and data; video, data and VoIP; or video, data, VoIP, and wireless service. Also, the service product attribute can include a video service attribute that identifies a level of content available, where the level of content is selected from a list that at least includes a premium level and a standard level. The level of content can also be selected from a list that includes: a standard level, a silver level, and a gold level. Further, the level can include a genre pack. In an illustrative embodiment, the gold level, but not the silver level or the standard level, can include selected premium content, such as HBO's Signature package. Also, in an illustrative embodiment, the silver level, but not the standard level, can include other premium content, such as include HBO's Family package.

In a particular embodiment, the facility deployment component identified by the service product order can be implemented as fiber to the premises (FTTP), fiber to the node (FTTN), or digital subscriber line (DSL) technology. Moreover, the set of permitted end user devices can include a residential gateway (RGW) device, a set top box, a digital video recorder, an integrated access device (IAD), and a session initiation protocol (SIP) telephone device.

Further, in another particular embodiment, the IPTV deployment subsystem 110 can include a broadcast channel map that is stored within a computer readable medium within the IPTV deployment subsystem 110. In a particular embodiment, the standard level includes the channels in the broadcast channel map and the premium level includes the channels in the broadcast channel map and at least one additional channel.

In yet another particular embodiment, the SDP subsystem 106 receives the service product offer information from the service product offer ordering subsystem 102 and provides one or more data items that identify a subscriber class, a subscriber subclass, and an item category as an input to the IPTV deployment subsystem 110. Further, the IPTV deployment subsystem 110 can map the subscriber class to a subscriber group and determine a content access grant level based on the subscriber group. In particular, one of a set of content packages can be selected based on the content access grant level and a selected content package can be communicated to a subscriber device, e.g., the gateway 160, that has access to the IPTV deployment subsystem 110. The IPTV deployment subsystem 110 can receive data that identifies a set of devices that are associated with a particular subscriber. The set of devices can be evaluated with respect to a particular end user device to receive a selected content package.

Additionally, in a particular embodiment, the IPTV deployment subsystem includes a plurality of video content packages. At least one of the plurality of video content packages can be selected for permitted transmission and can be granted access to protected content for a particular subscriber based on the service product order for the particular communication service subscriber identified.

Figure 2:
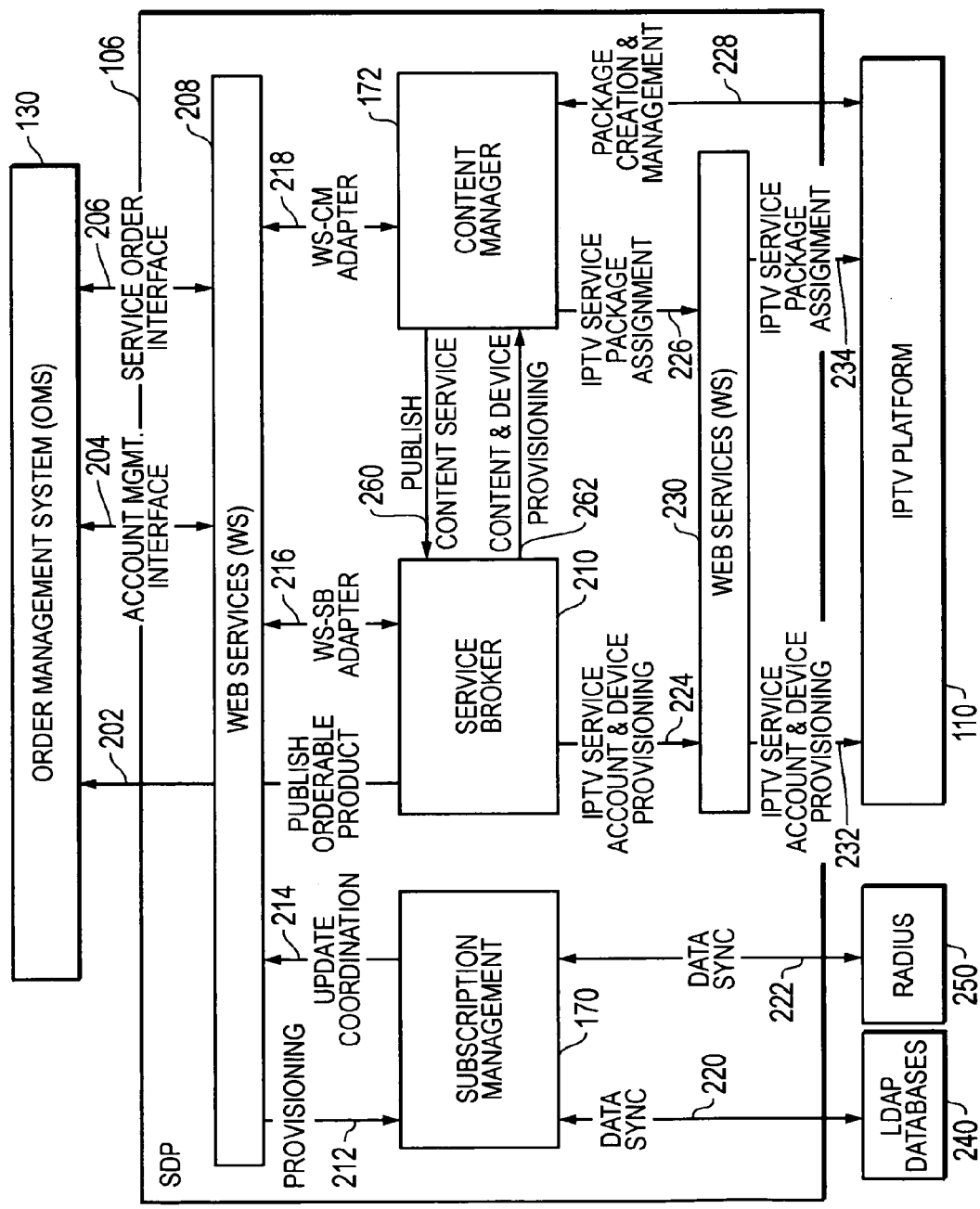
FIG. 2 is a block diagram that illustrates a service delivery platform subsystem.

Referring to FIG. 2, details concerning the service product ordering subsystem 130 and the SDP subsystem 106 are illustrated. As shown, the SDP subsystem 106 includes a first interface 208, such as a Web Services (WS) interface. In a particular embodiment, the service product ordering subsystem 130 is coupled to the first interface 208 via an account management interface 204 and a service order interface 206. The subscription management module 170 and the content manager 172 within the SDP subsystem 106 are also coupled to the first interface 208. As shown, the subscription management module 170 receives provisioning data 212 from the service product ordering subsystem 102 via the first interface 208 and transmits updated coordination data 214 to the service product ordering subsystem 130 via the first interface 208. In a particular embodiment, the content manager 172 is coupled to the first interface 208 via a WS-CM adapter 218.

FIG. 2 also shows a service broker 210 that is coupled to the first interface 208 via a WS-SB adapter 216. The service broker 210 can transmit a publish orderable product indication 202 to the service product ordering subsystem 102 via the first interface 208. As indicated in FIG. 2, the service broker 210 can communicate with the content manager 172. The content manager 172 can transmit a publish content service indication 260 to the service broker 210. Moreover, the service broker 210 can transmit content and device provisioning data 262 to the content manager 172.

As depicted in FIG. 2, the service broker 210 and the content manager 172 can be coupled to the IPTV delivery platform 110 via a second interface 230. In a particular embodiment, the second interface 230 can also be a WS interface. In a particular embodiment, the service broker 210 can transmit IPTV service account and device provisioning data 224 to the second interface 230 and, in turn, the second interface 230 can transmit IPTV service account and device provisioning data 224 to the IPTV delivery platform 110. Further, the content manager 172 can transmit IPTV service package assignment data 226 to the second interface 230 and the second interface 230, in turn, can transmit IPTV service package assignment data 234 to the IPTV delivery platform 110. Moreover, the content manager 172 and the IPTV delivery platform 110 can exchange package creation and management data 228 directly.

FIG. 2 also shows that the subscription management module 170 is coupled to one or more lightweight directory access protocol (LDAP) databases 240 and a radius server 250. Further, the subscription management module 170 exchanges data synchronization information 220, 222 with the LDAP databases 240 and the radius server 250.

Figure 3:
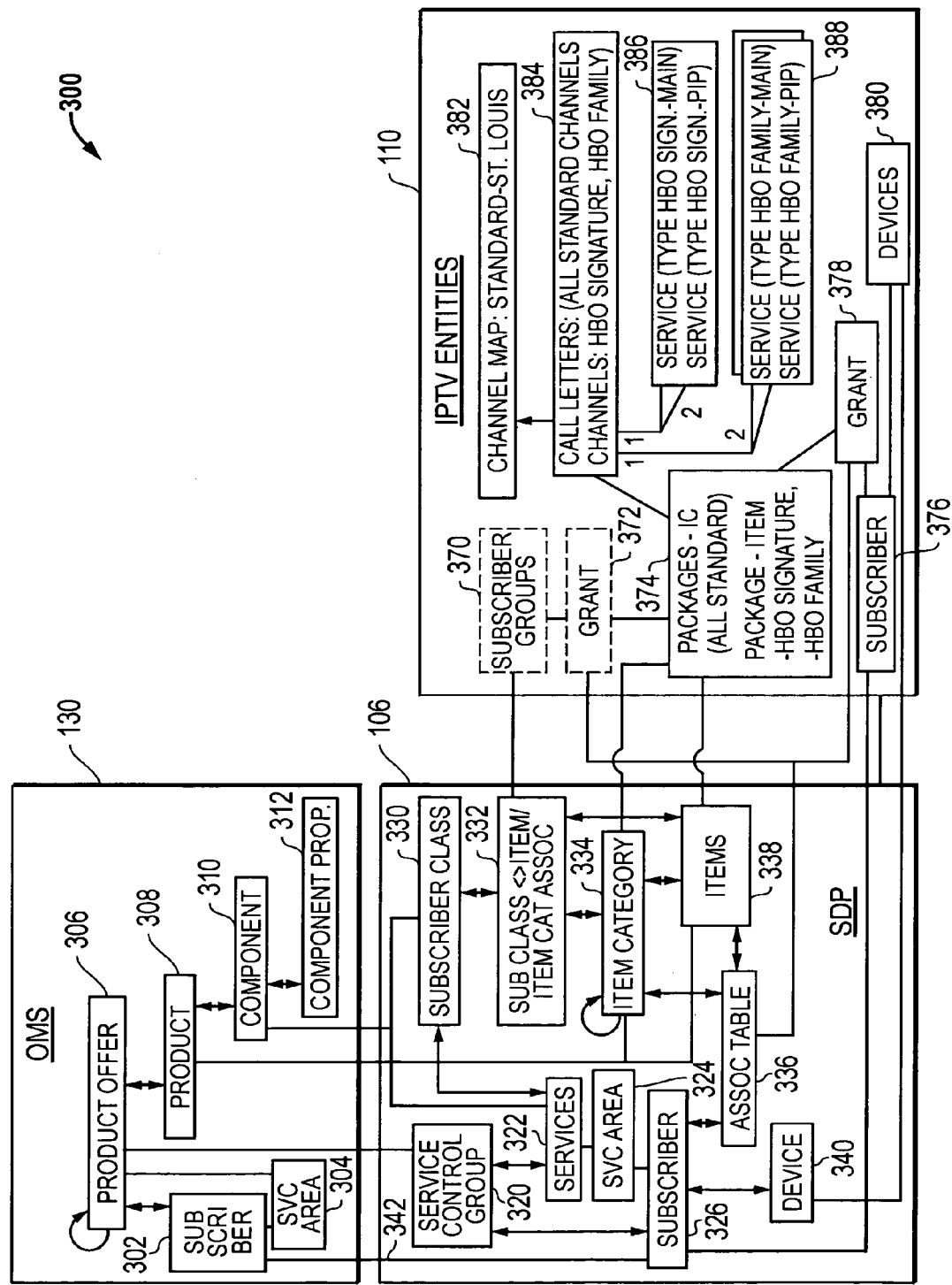
FIG. 3 is a block diagram that illustrates a service product ordering subsystem, a service delivery platform subsystem, and an IPTV deployment subsystem.

Referring to FIG. 3, further details of the service product ordering subsystem 130, the SDP subsystem 106, and the IPTV delivery subsystem 110 are shown. As illustrated in FIG. 3, the service product ordering subsystem 130 includes subscriber data 302, service area data 304, product offer data 306, product data 308, component data 310, and component property data 312.

Further, as depicted in FIG. 3, the SDP subsystem 106 includes service control group data 320, services data 322, service area data 324, subscriber data 326, subscriber class data 330, sub class item/item catalog association data 332, item category data 334, association table data 336, item data 338, and device data 340.

FIG. 3 indicates that the IPTV deployment subsystem 110 can include subscriber group data 370, a first set of grant data 372, content package data 374, subscriber data 376, a second set of grant data 378, and device data 380. Additionally, the IPTV deployment subsystem 110 can include a channel map 382 that includes a set of channels associated with a particular service area. The IPTV deployment subsystem 110 can also include a set of call letters 384 associated with the channel map 382. The set of call letters 384 can include the call letters associated with a group of standard channels and the call letters associated with one or more premium channels or groups of premium channels. In an illustrative embodiment, the premium channels can include HBO signature service and HBO family service.

As shown in FIG. 3, the IPTV deployment subsystem 110 can also include a first set of services 386 associated with one or more customer accounts and a second set of services 388 associated with one or more customer accounts.

Figure 4:
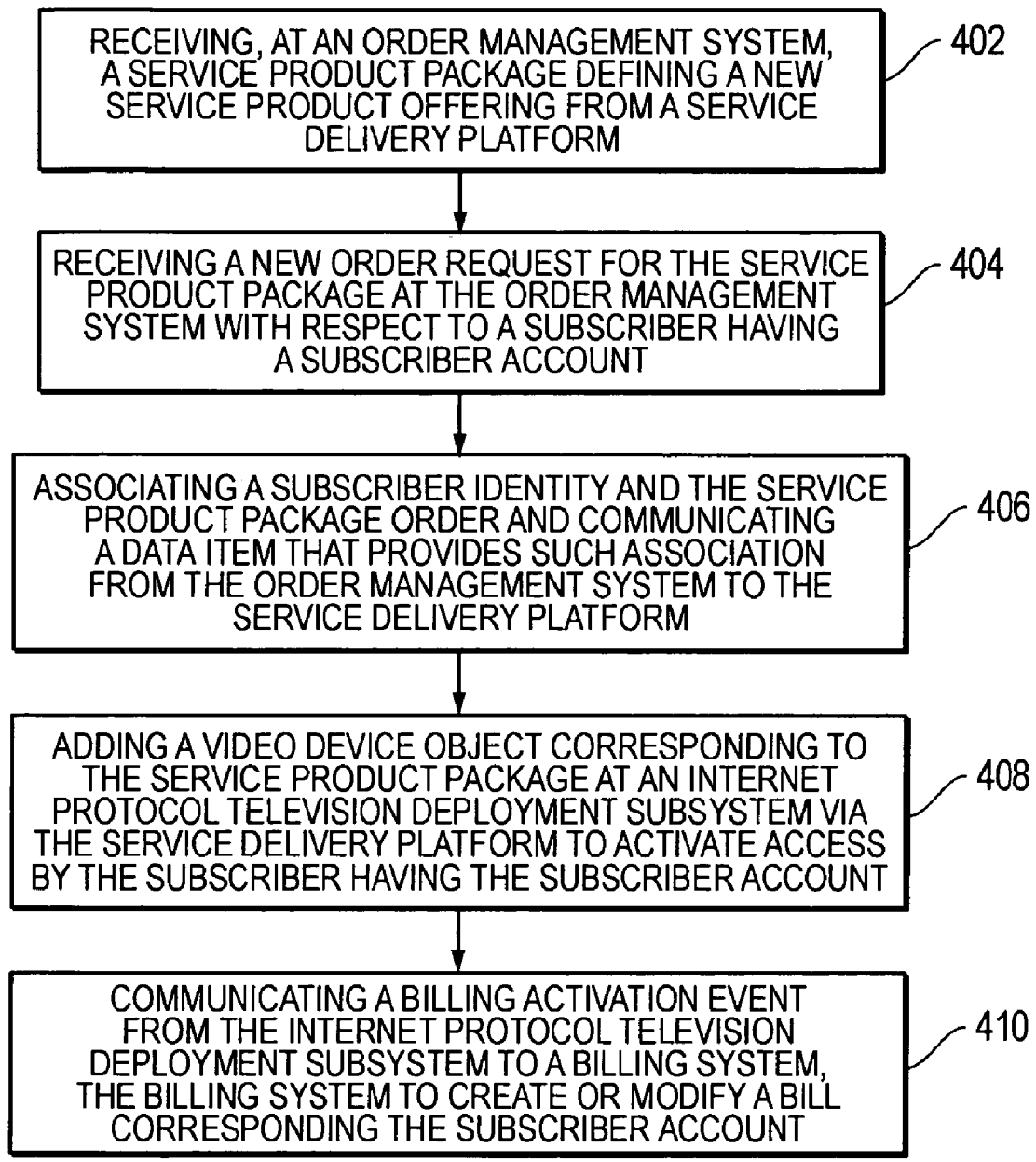
FIG. 4 is a flow chart that illustrates of a method of service product offer management.

FIG. 4 depicts a method of service product offer management. Commencing at block 402, an order management system receives a service product package that defines a new service product offering from a service delivery platform. At block 404, the order management system receives a new order request for the service product package with respect to a subscriber having a subscriber account. Moving to block 406, the order management system associates a subscriber identity with the service product package and communicates a data item that provides such association to the service delivery platform. At block 408, a video device object that corresponds to the service product package is added at an IPTV deployment subsystem via the service delivery platform to activate access by the subscriber that has the subscriber account. Proceeding to block 410, the internet protocol television deployment subsystem communicates a billing activation event to a billing system. The billing system can create or modify a bill that corresponds to the subscriber account.

In a particular embodiment, the service product package identifies a service area, a service control group, a service product attribute, a facility deployment component, and a set of permitted end user device types. Further, in a particular embodiment, the service product attribute identifies a product offer that is selected from the group consisting of: video only; video and data; video, data and voice over internet protocol; and video, data, voice over internet protocol and wireless.

Additionally, in a particular embodiment, the service product attribute includes a video service attribute that identifies a level of available content, the level of available content selected from a premium level and a standard level. Additionally, the service product package can include a video on demand selection or a pay-per-view selection.

Figure 5:
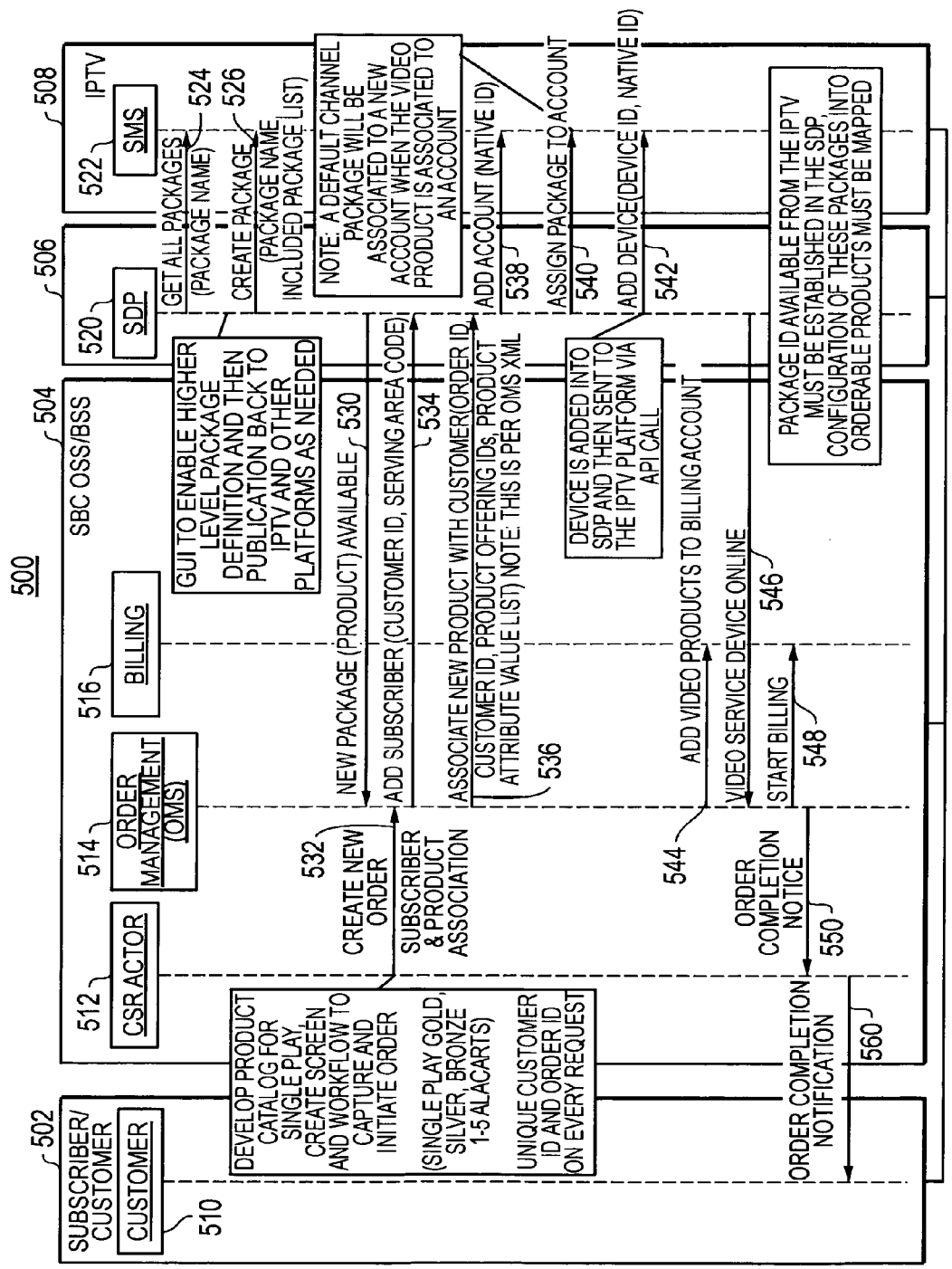
FIG. 5 is a ladder diagram that illustrates operation of a system and a method of service product offer management.

Referring to FIG. 5, a ladder diagram illustrating a particular method of authorizing content at an end user set top box device is shown superimposed over an Internet protocol television (IPTV) system that is generally designated 500. As shown in FIG. 5, the system 500 includes a customer location 502 that is coupled to an OSS/BSS server 504. The OSS/BSS server 504 is coupled to an SDP server 506 and an IPTV server 508.

FIG. 5 indicates that the customer location 502 includes a customer 510. Also, the OSS/BSS 504 includes a CSR actor module 512, an order management system (OMS) 514, and a billing subsystem 516. The SDP server 506 includes an SDP subsystem 520 and the IPTV server 508 includes a subscriber management system (SMS) 522. In a particular embodiment, the customer location 502 can include one of the CPE 162, 164, 166 depicted in FIG. 1. Further, in a particular embodiment, the OMS 514 can include one or more of the components of the OMS 130 shown in FIGS. 1 through 3. Also, in a particular embodiment, the billing subsystem 516 can include one or more of the elements of the billing subsystem 108 illustrated in FIG. 1. Additionally, the SDP subsystem 520 can include one or more components of the SDP subsystem 106 shown in FIGS. 1 through 3.

The method shown in FIG. 5 commences at step 524 and the SDP subsystem 520 transmits a get all packages request to the SMS subsystem 522 within the IPTV server 508. In a particular embodiment, the get all packages request includes a package name. At step 526, the SDP subsystem 520 transmits a create package request to the SMS subsystem. The create package request can include a package name and an included package list. In a particular embodiment, the SDP subsystem 520 can create a graphical user interface (GUI) that can enable higher level package definition and publication of the defined package to the IPTV deployment subsystem.

Moving to step 530, the SDP subsystem 520 transmits an indication to the OMS subsystem 514 that identifies that the new package, or product, is available. At step 532, the CSR actor 512 creates a new order that includes a subscriber and product association and sends the new order to the OMS subsystem 514. In a particular embodiment, the CSR actor can develop a product catalog for a single play. Further, the CSR actor 512 can create a screen and workflow to capture and initiate an order, e.g., received from the customer. An example of a product catalog can include a single play gold package, a silver package, a bronze package, and a plurality of "a la carte" packages. In a particular embodiment, each order request can include a unique customer identification and a unique order identification.

Continuing to step 534, the OMS subsystem 514 can add subscriber data to the new order received from the CSR actor 512. In a particular embodiment, the subscriber data can be added based on a customer identification and a serving area code. At step 536, the OMS subsystem 514 can associate a new product with the customer. This association can be based on an order identification, a customer identification, one or more product offering identifications, and a product attribute value list. In an illustrative embodiment, this association can be made using extensible markup language (XML).

At step 538, the SDP subsystem 520 adds an account identification, e.g., a native identification, to the order. Further, at step 540, the SDP subsystem 520 assigns a service package to the account. Moving to step 542, the SDP subsystem 520 adds a device to the order. The device can be added by adding a device identification and a native identification. In a particular embodiment the device is added by the SDP subsystem and sent to an IPTV platform via an application programming interface (API) call.

Proceeding to step 544, the OMS subsystem 514 adds one or more video products to a billing account, e.g., a billing account. At step 546, the SDP subsystem 520 transmits an indication to the OMS subsystem 514 that a video service device is online. At step 548, the OMS subsystem 514 instructs the billing subsystem 516 to begin billing the customer for the service. Thereafter, at step 550, the OMS subsystem 514 transmits an order completion notice to the CSR actor subsystem 512. At step 560, the CSR actor subsystem 512 transmits an order completion notification to the customer 510 and the method then ends. In a particular embodiment, the package identification that is available from an IPTV platform is established within the SDP subsystem 520. Further, the configuration of the available packages into orderable products can be mapped by the SDP subsystem 520.

Figure 6:
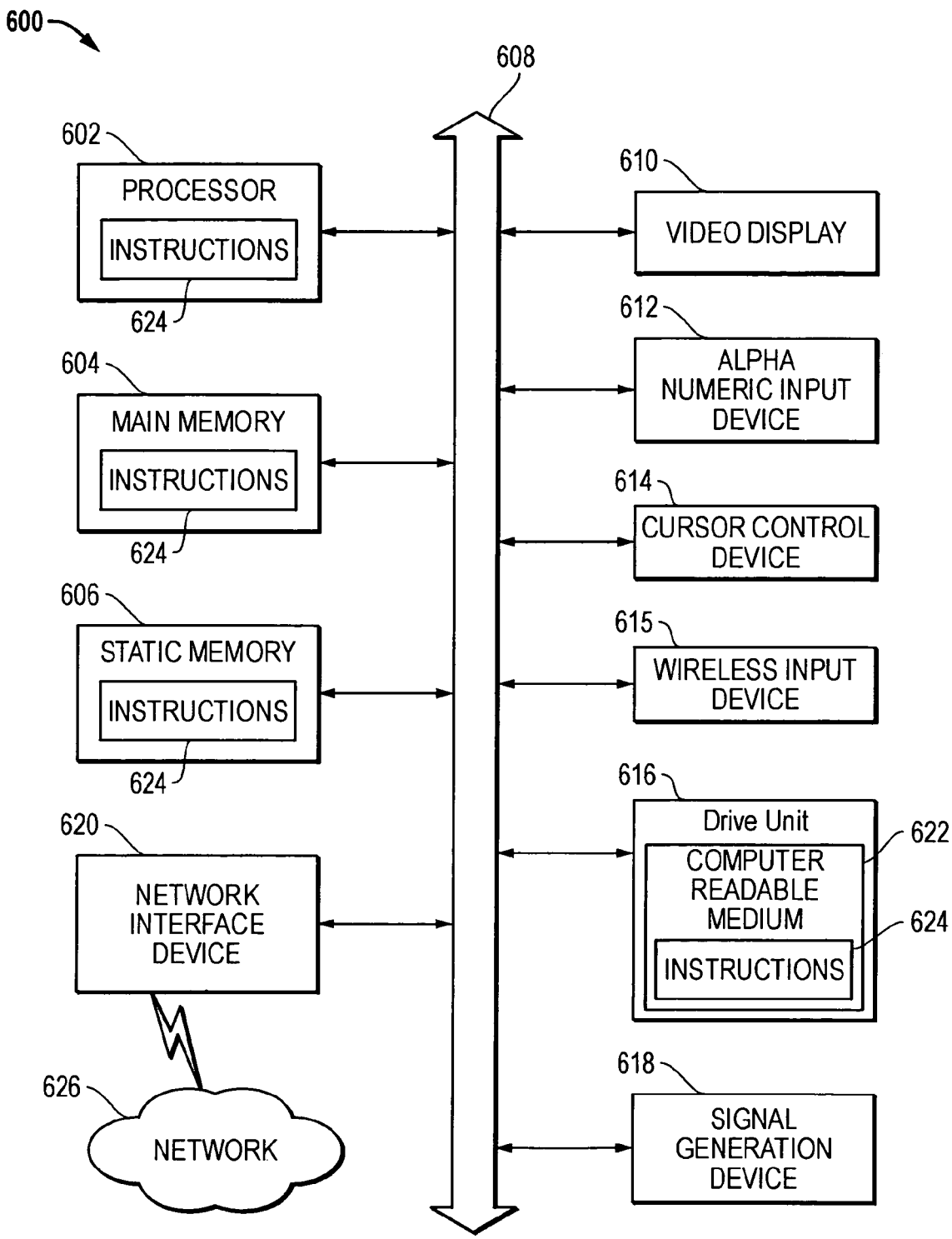
FIG. 6 is a diagram of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. In a particular embodiment, one or more of the system or subsystem components illustrated in FIGS. 1 through 4 can include one or more of the elements described in conjunction with the computer system 600 depicted in FIG. 6.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. Further, the computer system 600 can include a wireless input device 615, e.g., a remote control device. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the devices and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to order and deliver services, the system comprising:
   a service ordering subsystem that receives and processes a service order, the service order identifying at least one service subscriber, a service area, a service control group, a service attribute, a facility deployment component, and a set of device types, the service ordering subsystem including a catalog of services, a definition for each service, and a workflow, wherein the workflow is used to create the service order;
   a service delivery subsystem coupled to the service ordering subsystem, the service delivery subsystem comprising:
      a subscription manager that receives provisioning data from the service ordering subsystem, processes the provisioning data to create coordination data, and transmits the coordination data to the service ordering subsystem;
      a service broker that indicates orderable products to the service ordering subsystem and sends provisioning data to a content manager; and
      the content manager receiving the provisioning data from the service broker and transmitting delivery data to an Internet Protocol Television (IPTV) delivery subsystem; and
   the IPTV delivery subsystem coupled to the service delivery subsystem, the IPTV delivery subsystem including a plurality of video content packages, wherein the IPTV delivery subsystem transmits one of the plurality of video content packages to the at least one service subscriber when the service order is received.

2. The system of claim 1, wherein the service attribute identifies a product offer that is selected from the group consisting of: video only; video and data; video, data and voice over internet protocol; and video, data, voice over internet protocol, and wireless.

3. The system of claim 2, wherein the service attribute includes a video service attribute that identifies a level of content available, the level of content selected from a premium level and a standard level.

4. The system of claim 3, wherein the level of content is selected from a standard level, a silver level, a gold level, and includes a genre pack.

5. The system of claim 4, wherein the gold level, but not the silver level or the standard level, includes an HBO Signature package.

6. The system of claim 5, wherein the silver level, but not the standard level, includes an HBO Family package.

7. The system of claim 1, wherein the facility deployment component is selected from fiber to the premises (FTTP), fiber to the node (FTTN), and digital subscriber line (DSL).

8. The system of claim 1, wherein the set of device types is selected from a residential gateway (RGW) device, a set top box device, a digital video recorder, an integrated access device (IAD), and a session initiation protocol (SIP) telephone device.

9. The system of claim 3, wherein the IPTV delivery subsystem includes channels in a broadcast channel map stored in a computer readable memory.

10. The system of claim 9, wherein the standard level includes the channels in the broadcast channel map and wherein the premium level includes the channels in the broadcast channel map and includes at least one additional channel.

11. The system of claim 1, wherein the service delivery subsystem receives services information from the service ordering subsystem and provides a data item that identifies a subscriber class, a subscriber subclass, and an item category as an input to the IPTV delivery subsystem.

12. The system of claim 11, wherein the service delivery subsystem maps the subscriber class to a subscriber group and determines a content access grant based on the subscriber group, wherein one of a set of content packages is selected based on the content access grant and wherein the selected content package is communicated to a subscriber device having access to the IPTV delivery subsystem.

13. The system of claim 12, wherein the subscriber device includes a subscriber data gateway coupled to a plurality of different customer premises equipment units.

14. The system of claim 13, wherein the IPTV delivery subsystem receives data that identifies a set of devices associated with a particular subscriber and wherein the data that identifies the set of devices is evaluated with respect to an end user device to receive the selected content package.

15. The system of claim 1, wherein the service ordering subsystem is coupled to the service delivery subsystem via an account management interface and a service order interface.

16. The system of claim 1, wherein the service delivery subsystem is coupled to the IPTV delivery subsystem via a device provisioning interface and via an IPTV service package assignment interface.

17. The system of claim 1, wherein the service delivery subsystem provides a set of service products that may be offered via the service ordering subsystem.

18. A method of ordering a service product, the method comprising:
   receiving, at an order management system, a service product package defining a service product offering from a service delivery platform;
   receiving an order request for the service product offering at the order management system with respect to a subscriber having a subscriber account;
   associating a subscriber identity and the service product package order and communicating a data item that provides such association from the order management system to the service delivery platform, the data item identifying at least one service subscriber, a service area, a service control group, a service attribute, a facility deployment component, and a set of device types, the order management system including a catalog of services, a definition for each service, and a workflow, wherein the workflow is used to create the data item;
   providing provisioning data to a delivery service platform and receiving coordination data from a subscription manager of the delivery service platform, wherein the coordination data is based on processing the provisioning data, and wherein the provisioning data is sent to a content manager via a service broker and delivery data is transmitted to an Internet Protocol Television (IPTV) delivery subsystem via the content manager;
   receiving an indication of orderable products;
   adding a video device object corresponding to the service product package at the IPTV delivery subsystem via the service delivery platform to activate access by the subscriber having the subscriber account;

communicating a billing activation event from the order management system to a billing system, the billing system to create or modify a bill corresponding to the subscriber account; and providing an order completion notification to the subscriber.

19. The method of claim 18, wherein the service product package identifies a service area, a service control group, a service product attribute, a facility deployment component, and a set of permitted end user device types.

20. The method of claim 19, wherein the service product attribute identifies a product offer that is selected from the group consisting of: video only; video and data; video, data and voice over internet protocol; and video, data, voice over internet protocol and wireless.

21. The method of claim 19, wherein the service product attribute includes a video service attribute that identifies a level of available content, the level of available content selected from a premium level and a standard level.

22. The method of claim 18, wherein the service product package includes a video on demand selection.

23. The method of claim 18, wherein the service product package includes a pay-per-view selection.

* * * * *